Jan. 20, 1970     A. F. MADONIA     3,490,353

ROLL PACKING METHOD

Original Filed Sept. 27, 1965     7 Sheets-Sheet 1

INVENTOR.
Anthony F. Madonia
BY
Christel & Bean
ATTORNEYS.

United States Patent Office 3,490,353
Patented Jan. 20, 1970

3,490,353
ROLL PACKING METHOD
Anthony F. Madonia, 65 Tacoma Ave.,
Buffalo, N.Y. 14216
Original application Sept. 27, 1965, Ser. No. 490,211.
Divided and this application July 31, 1968, Ser.
No. 764,357
Int. Cl. B65b 25/16
U.S. Cl. 99—172                                      2 Claims

ABSTRACT OF THE DISCLOSURE

A first sheet of flexible material is fed through a first packing station to a second packing station and a layer of objects is deposited thereon. A second sheet of flexible material is fed to the first packing station and a layer of objects is deposited thereon. An open top box is fed through the first packing station and then through the second packing station. The first sheet with the objects thereon is fed into the box as the latter is fed through the first packing station and the second sheet with the objects thereon is fed into the box onto the objects on the first sheet as the box is fed through the second station. The objects are fed along a path and grouped in a predetermined arrangement prior to being deposited on the sheets of flexible material by temporarily holding at least certain of the objects against movement.

---

This application is a division of application Ser. No. 490,211 filed Sept. 27, 1965.

This invention relates to a new and useful method of packing rolls, buns and other such objects in containers therefor, and to a new and useful apparatus for packing rolls, buns and the like.

Hamburger buns, hot dog rolls and the like often are packed at the bakery in layers each containing several rows of such rolls, the boxes then being delivered to large customers. The packing operation usually is done by hand, because so far as I am aware there has been no truly successful apparatus for carrying out the operation. Hand packing is both time consuming and expensive, because in a normal production line several people are required to pick up the rolls from the discharge end of the slicer and place them in the boxes.

It is desirable to avoid the hand labor involved in this operation, and efforts have been made to produce an apparatus which will do the job automatically. However, so far as I am aware no prior apparatus has been completely successful. A major problem seems to be that the rolls or buns tumble as they are delivered into the boxes, and pile up instead of being positioned in rows and layers as desired.

A primary object of this invention is to provide a method of packing rolls, buns and the like in boxes automatically with no attendant other than one to oversee the operation.

Another object of this invention is to provide an apparatus for automatically packing rolls, buns and the like in containers therefor.

The foregoing and other objects and advantages of this invention will become more clearly apparent from the ensuing detailed description of the method of packing, and of an illustrative apparatus for carrying out the packing method of this invention, the same being depicted in the accompanying drawings wherein like reference numerals denote like parts throughout and wherein:

Briefly stated, I have discovered that the problem of tumbling or spilling during packing can be avoided, and that rolls can be packed in boxes a layer at a time, by using a flexible sheet of material such as wax paper as a floor, and feeding the flexible sheet floor with the rolls thereon into the box.

The foregoing is perhads best illustrated with reference to FIGS. 14–19 wherein there is diagrammatically shown a first conveyor, generally designated 1, arranged to feed containers in the form of open top boxes 2 along a given path through a first packing station A and then a second packing station B. The objects being packed, here shown as hamburger rolls or buns 3 are delivered to the apparatus of my invention from the discharge chute 4 of a conventional bun slicing machine or any other mechanism, the details of which are no part of my invention and therefore are not shown. The buns 3 are delivered to a conveyor generally designated 5 in successive rows of five buns to a row, the rows being delivered in groups of two as clearly shown in FIG. 14. The first group of rolls is held by a gate 6 while the succeeding group is held by a gate 7. When the third group of rolls abuts the second the gate 7 opens to permit the last four rows of buns to move against the first two rows thereof, whereupon the gate 6 opens and the buns are deposited on a sheet 8 of flexible material comprising preferably wax paper.

Figure 14:
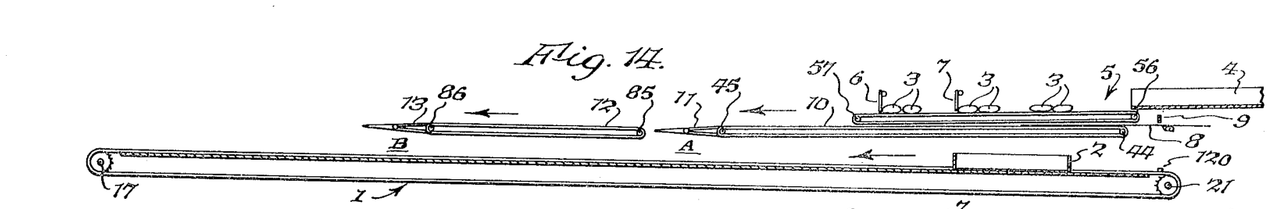
FIGS. 14–19 are diagrammatic views illustrating the operation of the apparatus and various steps in the method of this invention.
Figure 15:
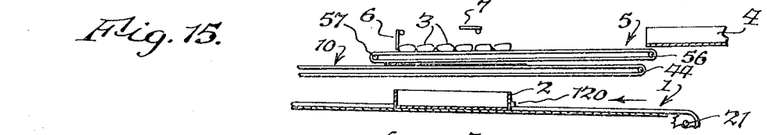

The sheets 8 are cut by a knife mechanism 9 into the correct lengths, to fit within the box 2, and successive sheets 8 are delivered by a conveyor 10 past the end of conveyor 5 to the first packing station A.

Figures 1, 2, 3:
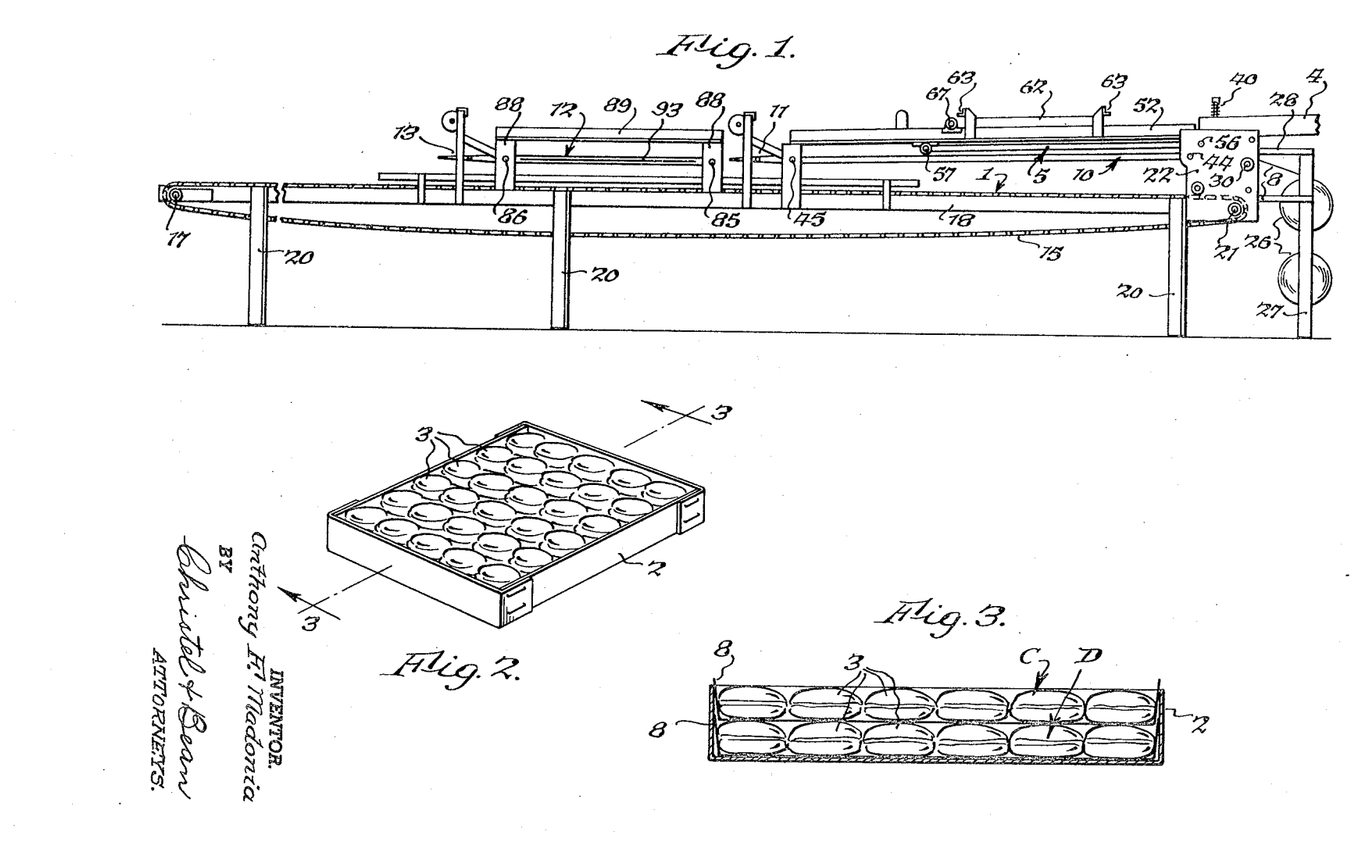
FIG. 1 is a side elevational view of a packing apparatus of this invention.
FIG. 2 is a top perspective view of a box packed with rolls by the method of my invention using the apparatus of FIG. 1.
FIG. 3 is a sectional view thereof, on an enlarged scale, taken about on line 3—3 of FIG. 2.
Figures 16, 17, 18, 19:
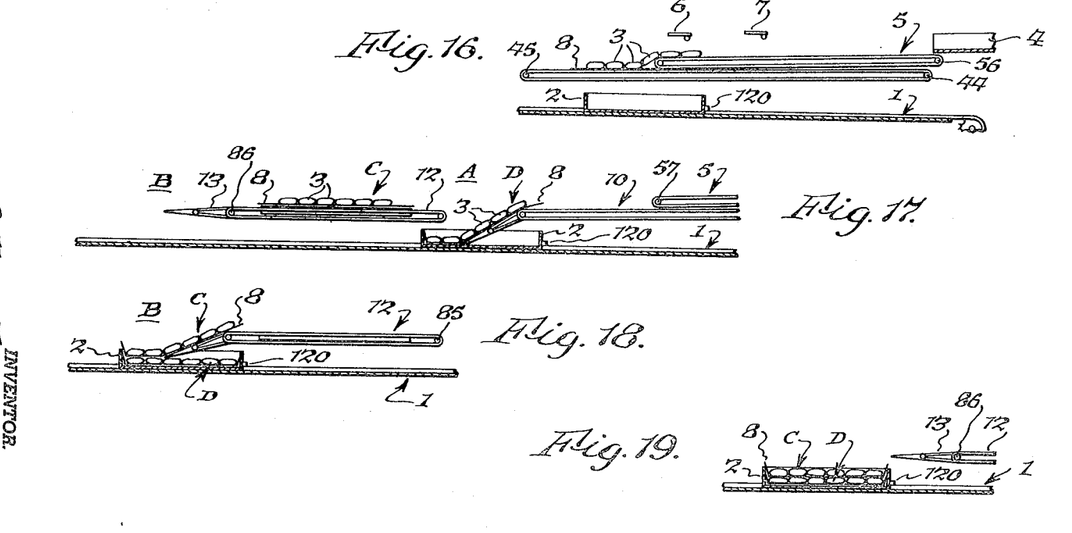

The apparatus is timed whereby as gate 6 opens the flexible sheet 8 is positioned to receive the six rows of buns, five to a row, which are deposited onto sheet 8 a row at a time by conveyor 5. Conveyor 1 continues movement of sheet 8 with rows of buns 3 thereon, and the first sheet 8 with the layer of buns 3 thereon is conveyed across a chute 11, by-passing packing station A, to conveyor 12 which conveys the sheet toward the packing station B. However, as illustrated in FIG. 17 the first sheet 8 with the layer C of buns 3 thereon is held on conveyor 12, temporarily, while the succeeding sheet 8 on which layer D of buns 3 has been deposited is fed down chute 11 into the box 2 which is positioned therebeneath. Chute 11 is lowered as the sheet 8 bearing layer D and box 2 arrive at the first packing station A. The chute lowers into the box adjacent the forward end thereof, whereby the leading edge portion of sheet 8 is deposited against the forward wall of the box with the first row of buns 3 deposited on the floor or bottom of the box adjacent the forward end wall thereof. Conveyor 1 continues to move box 2 through packing station A as the sheet 8 containing layer D moves downwardly on chute 11, whereby sheet 8 with layer D thereon is deposited in the bottom of box 2, the sheet and layer being progressively deposited in box 2 a row at a time. As box 2 is moved by conveyor 1 toward packing station D, conveyor 12 moves sheet 8 with layer C thereon toward station B. As box 2 with layer D therein moves through packing station B, chute 13 lowers into the box in the same manner as chute 11 and sheet 8 with the layer C thereon is conveyed downwardly along chute 13 and onto layer D in the box 2, beginning with the forward end of the latter and continuing progressively rearwardly as the box is moved along through station B, as depicted in FIG. 18. At the conclusion of the packing operation at station B the box is completely packed, and the flexible sheet A carrying layer C of buns 3 comprises a separator between the layers C and D. The flexible sheet 8 of layer D is on the bottom of the box, and it will be noted, from FIG. 3, that the opposite ends of the sheets extend upwardly along the opposite end walls of the box. An attendant can then place another sheet of wax paper over the layer C and put a cover on the box, as may be desired. Also, it will be appreciated that additional layers of rolls or buns could be packed by my invention.

The discharge chutes lower into the boxes immediately behind the forward end walls thereof. Because of the relatively steep pitch of chute 11 relative to conveyor 10, there is a tendency for the rows of rolls to separate as sheet 8 moves from conveyor 10 onto chute 11, especially from the fourth row on. It is essential that the separated rows be brought together in order to properly fit into the box. This is accomplished by utilizing a sheet 8 having a sufficiently low coefficient of friction on its upper, roll engaging surface that the separated rows of rolls will slide along the sheet into abutting relation as the sheet moves down the chute.

In addition to the aforesaid low coefficient of sliding friction, the sheets 8 must be sufficiently rigid or shape-sustaining in the plane of the sheet to avoid buckling out of the plane of the sheet between rows of rolls.

A good grade of commercially available wax paper having a high sheen, for the roll surface side, has been found to be suitable, and it has the further advantage that it is moisture resistant and therefore does not extract moisture from rolls and other baked goods. However, other materials having these properties could be used.

Figure 12:
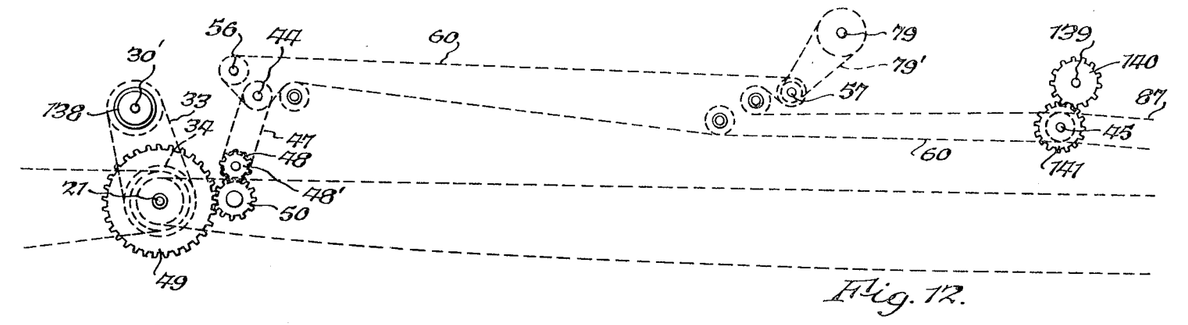
FIGS. 12 and 13, taken together, are diagrammatic views of the drive train.
Figure 13:
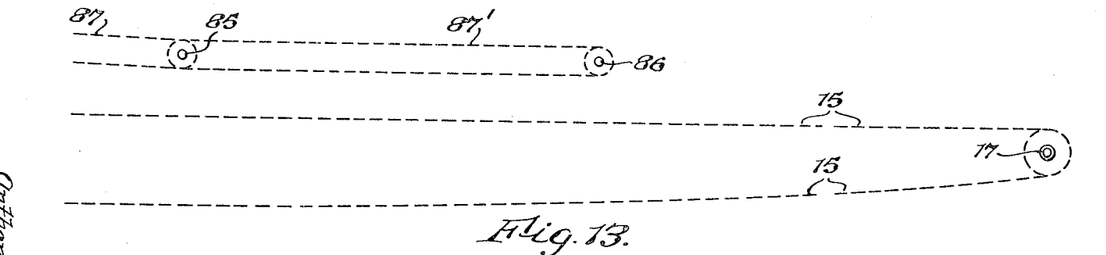

Referring now in greater detail to the illustrative apparatus depicted in the accompanying drawings, conveyor 1 comprises a pair of endless chains 15 trained over sprockets 16 and 17 journaled at opposite ends of a main frame comprising angle side members 18 spanned by a plate 19 and fixed to the upper ends of supporting legs 20. Sprockets 16 comprise drive sprockets on a shaft 21 extending between and journaled in opposite side plate members 22 mounted on the main frame. Power is supplied to the drive sprockets from any suitable source through a power drive chain 23 (FIG. 12) which can be driven from the machine, not shown, delivering the sliced rolls along the infeed chute 4. Drive chain 23 is connected to a main drive sprocket 25 mounted on shaft 21.

The waxed paper or other flexible sheet material is conveniently supplied in roll form, as shown at 26, the lower roll being a spare and the upper roll being the one from which the sheet material is being drawn. Rolls 26 are mounted on axles between uprights 27 which are connected to the side plates 22 by members 28.

Figure 20:
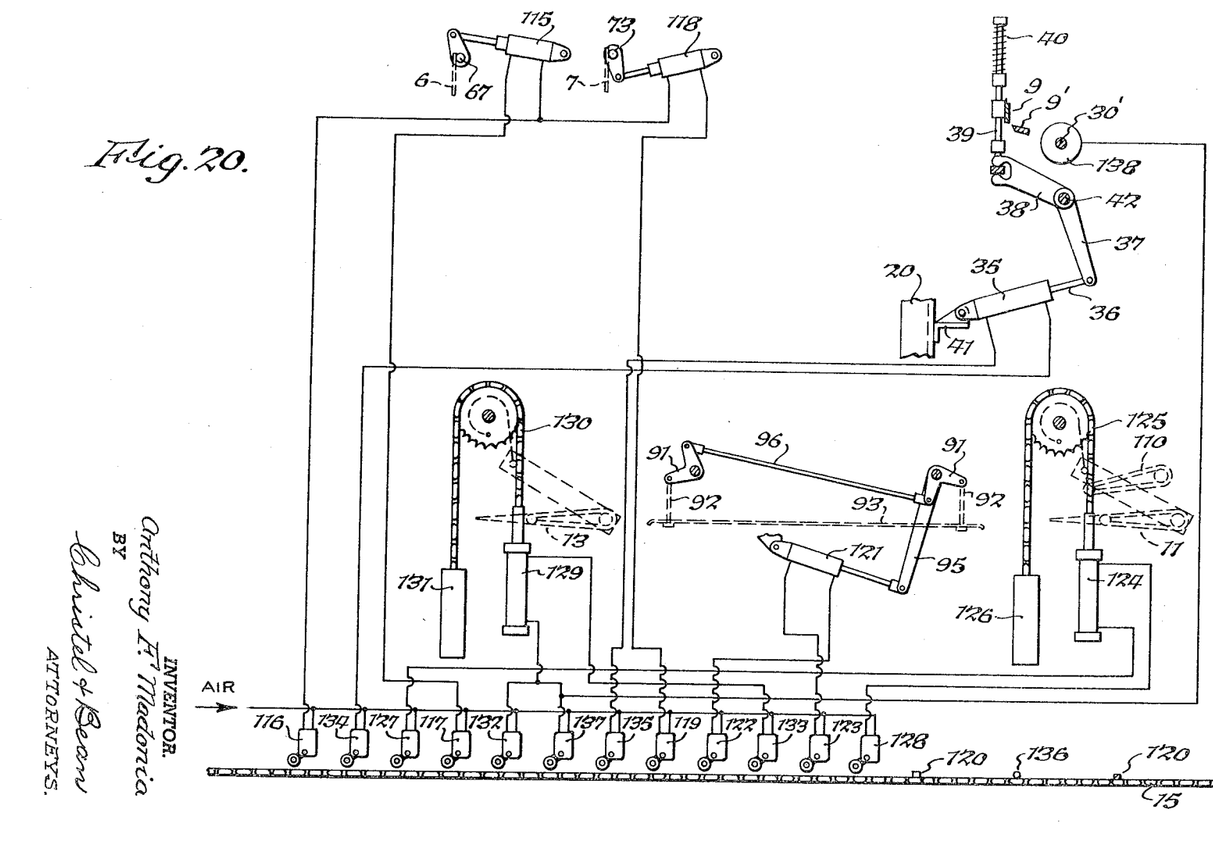
FIG. 20 is a diagrammatic view of the controls used in the apparatus of FIG. 1.

The sheet material 8 is passed between a drive roll 30 and pivoted pinch rolls 31 beneath a vertically reciprocating knife 9 and across a guide plate 32 to conveyor 10. The paper feed roll 30 is mounted on shaft 30' journaled in side plates 22 and driven by a chain 33 (FIG. 12) from a take-off sprocket 34 on drive shaft 21 through a fluid clutch 138 (FIG. 20). Knife 9 is actuated by a fluid motor 35 having a reciprocable piston rod 36 connected via crank arms 37 and 38 to a cross bar 39' connecting a pair of vertically reciprocating plunger rods 39 on which the knife 9 is mounted. Springs 40 acting against the upper end of the plunger rods 39 urge the knife 9 into its uppermost position. The cylinder of motor 35 is pivotally mounted on a bracket 41 on the main frame, and arms 37 and 38 are pivotally mounted on the side plates 22 as shown at 42. The movable knife or cutting bar 9 works against a knife edge bed 9'.

The sheets 8 are severed to the proper length, and then fed toward packing station A by conveyor 10 which comprises a series of laterally spaced endless bands 43 of flexible material presenting a friction surface, such as rubber. Bands 43 extend between shafts 44 and 45 and the upper flight thereof extend across and are supported by a plate 46. Shaft 44 is a drive shaft, being driven by a chain 47 engaging a sprocket 48 connected to a driving gear 49 on shaft 21 through gear 48' and an idler gear 50.

Conveyor plate 46 is supported by a series of rods 51 depending from a pair of angle members 52 on opposite sides of the apparatus, the angle members extending between side plates 22 and uprights 53 which latter are connected at their lower ends to the main frame. A second slide plate 54 is similarly supported and similarly supports the upper flight of conveyor 10 between the end of conveyor 5 and packing station A. A continuous plate could be provided instead of separate plates 46, 54.

Conveyor 5 comprises a series of laterally spaced endless friction bands or belts 55 which can be identical to the bands 40 except in length and which extend between a drive roller 56 and a roller 57. The upper flight of conveyor 5 is supported on a slide plate 58 carried by the depending rods 51, and it will be noted that the return flights of both conveyors 5 and 10 are supported by shafts carried by struts 59 depending from the angles 52. Drive shaft 56 is driven by a drive chain 60 trained around a sprocket thereon and a drive sprocket connected to drive shaft 44.

Figure 8:
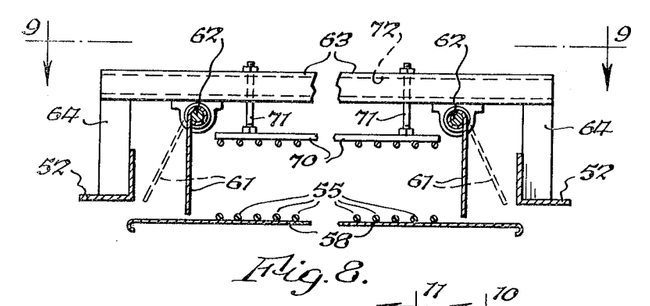
FIG. 8 is a fragmentary transverse sectional view thereof on an enlarged scale, being taken about on line 8—8 of FIG. 4.
Figure 9:
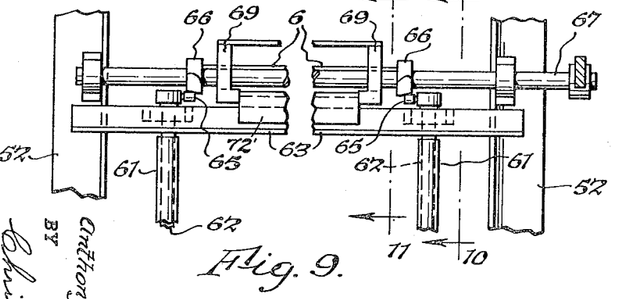
FIG. 9 is a fragmentary top plan view thereof taken about on line 9—9 of FIG. 8.
Figure 10:
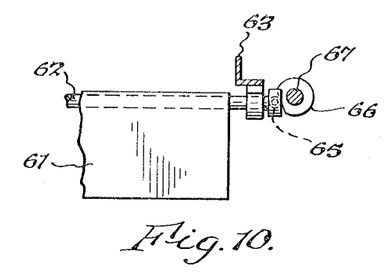
FIGS. 10 and 11 are fragmentary sectional views taken about on lines 10—10 and 11—11, respectively, of FIG. 9.
Figure 11:
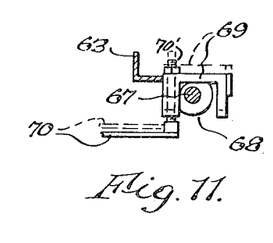

The buns are delivered via chute 4 onto the upper, conveying flight of bands 55. The bands 55 of conveyor 5 deliver the buns between opposite side gates 61 and against the gates 7 and 6. The gates 61 are carried by shafts 62 (FIGS. 8–10) journaled on cross frame members 63 carried by uprights 64 connected to side angle members 52 on opposite sides of the apparatus. At one end, each shaft 62 carries a laterally projecting follower 65 bearing against a beveled cam 66 carried by a shaft 67 journaled in supports mounted on the side angles 52.

Figures 4, 5:
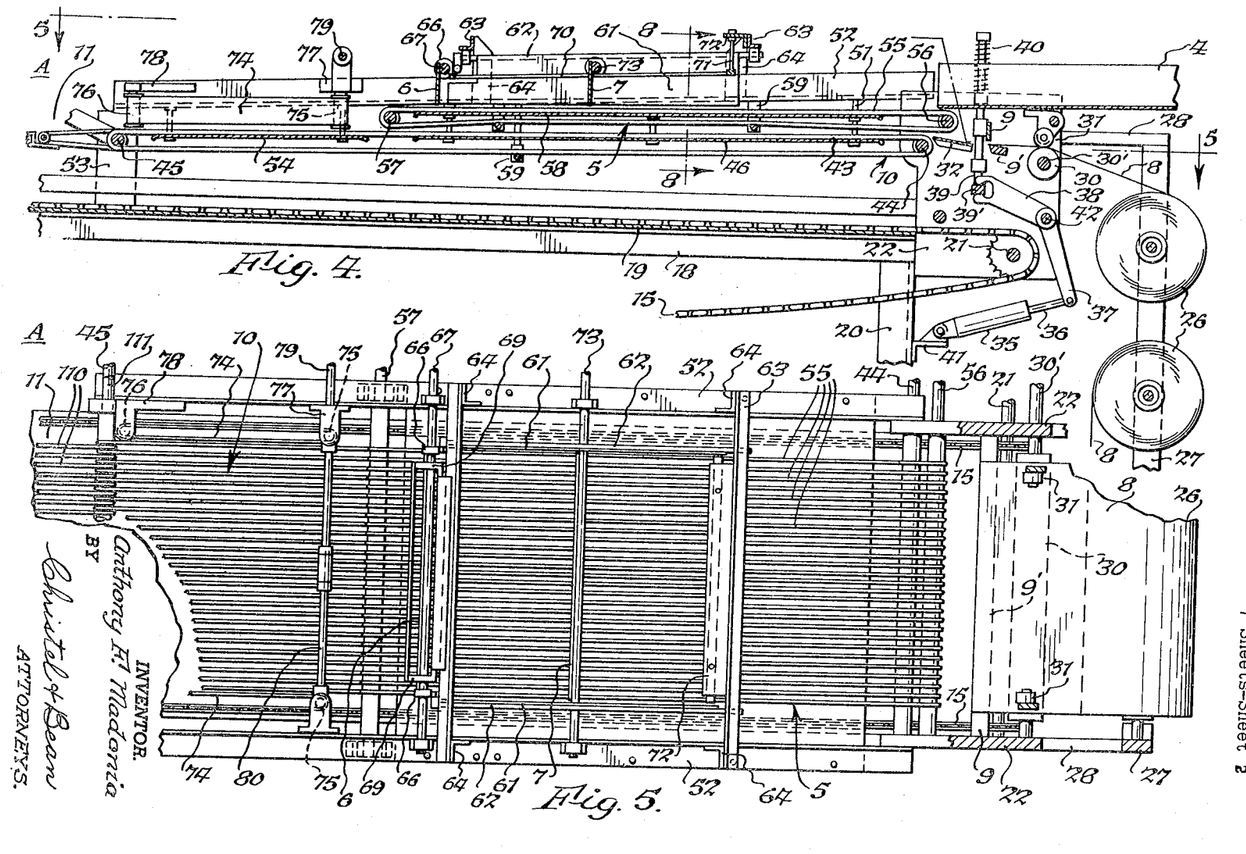
FIG. 4 is a fragmentary view, partly in side elevation and partly in longitudinal section, showing the infeed end of the apparatus of FIG. 1 on an enlarged scale.
FIG. 5 is a view thereof partly in top plan and partly in section, being taken about on line 5—5 of FIG. 4, the various drive gears and sprockets being omitted for ease and clarity in illustration.

Shaft 67 also carries a pair of cams 68 which engage in inverted U-shaped frames 69 connected together and to one end of a hold-down grill 70 by rods 70'. The opposite end of grill 70 is supported by rods 71 (FIG. 4) on an angle 72 mounted on the input angle 63. A guide 72' extends from output angle 63 between frames 69.

The output gate 6 also is mounted on shaft 67, for rotation therewith, the gate 7 being mounted on a shaft 73 journaled between the angle members 52. The buns or rolls are accumulated on conveyor 5 as previously described, with gate 7 and then gates 6 and 61 being lifted out of the way whereupon the rolls are deposited on a sheet 8 which then is being moved by conveyor 10 past the discharge end of conveyor 5. Gates 6 and 61 are actuated by motor 115 (FIG. 20) while gate 7 is actuated by motor 118. By accumulating the rolls in the manner described, they do not pile up on one another.

The layer of rolls is maintained assembled on conveyor 10 by vertically arranged endless belts 74 on opposite sides thereof, the belts being driven by spindles 75 and engaging around idlers 76, the spindles 75, 76 being journaled in brackets 77, 78, respectively, and the spindles 75 being rotated by a drive shaft 79 and a connecting drive shaft 80, the drive shafts having a beveled gear drive arrangement with the vertical shafts of the drive spindles 75. The inner faces of belts 74 move in the same direction as the conveying flight of conveyor 10 in synchronism therewith, and therefore maintain the layer of buns in assembled relation as they pass onto the chute 11. Shaft 79 is driven by chain 79' (FIG. 12) engaging sprockets thereon and on shaft 57.

Figure 6:
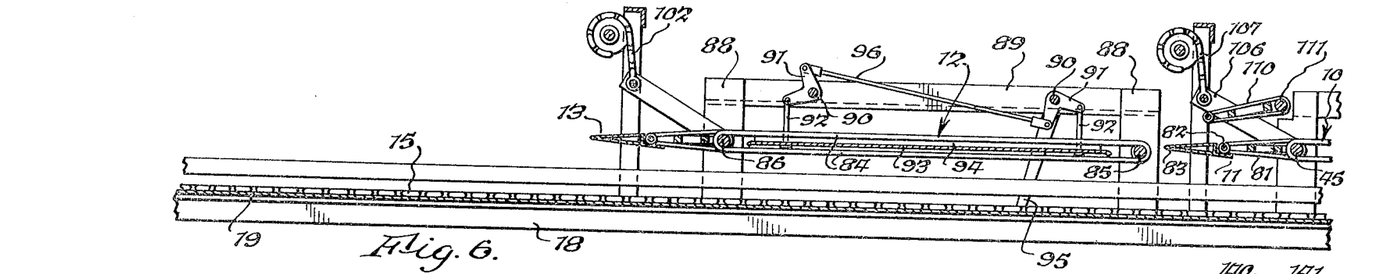
FIG. 6 is a view corresponding to that of FIG. 4 but showing another portion of the apparatus.
Figure 7:
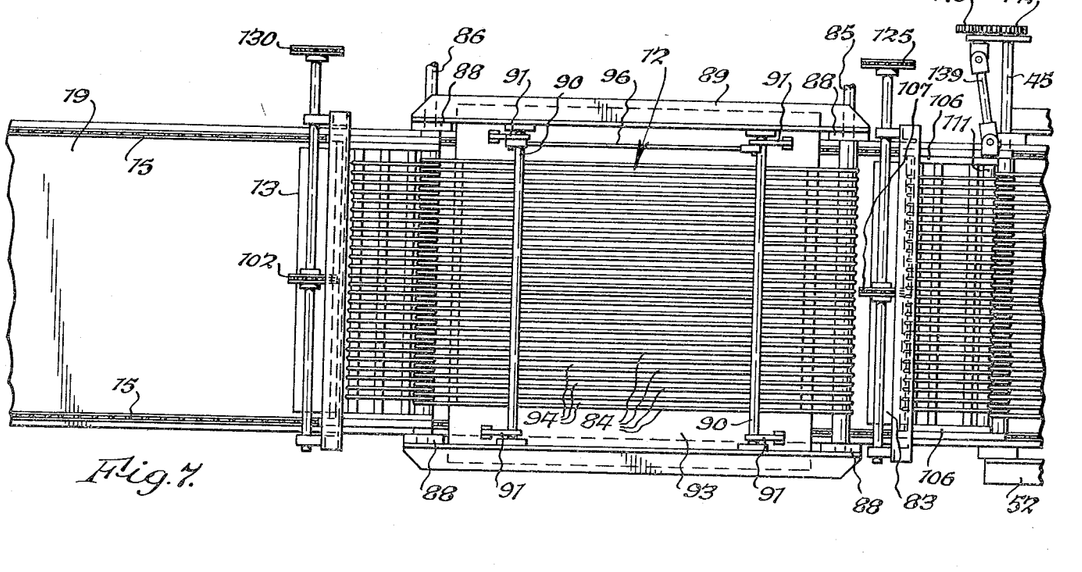
FIG. 7 is a top plan view of that portion of the apparatus which is shown in FIG. 6, various drive gears and sprockets being omitted for ease and clarity in illustration.

Chute 11 comprises a series of endless friction drive belts 81 engaging around shaft 45 which is a driven shaft with respect to belts 81, and also around an idler shaft 82, to which the discharge slide end 83 of the chute 11 is pivoted. Thus, belts 81 continue to convey sheet 8 with the assembled rolls 3, and when in the position shown in FIGS. 4 and 6 convey the same across the slide end 83 to conveyor 12, by-passing station A. Conveyor 12, like conveyors 5 and 10 comprises endless friction drive belts 84 which engage around drive roller shafts 85 and 86. Shaft 85 is driven by a chain 87 engaging sprockets thereon and on shaft 45. Shaft 86 is driven by a chain 87' engaging sprockets thereon and on shaft 85. Shafts 85 and 86 are journaled between uprights 88 carried on the main frame. Side angle members 89 extend between uprights 88, and a pair of cross shafts 90 mounting bell cranks 91 are journaled thereon. One arm of each crank 91 has a rod 92 pivoted thereon and connected to a plate 93 carrying a series of upright spacers 94 of a size to fit between adjacent conveyor belts 34 and project above the conveying flight level thereof when plate 93 is raised. Plate 93 is raised by a lever 95 connected to one shaft 90, a connecting rod 96 extending between the other crank arms of the bell cranks 91 on one side of the apparatus. Lever 95 is actuated by fluid motor 121 (FIG. 20).

Like the chute 11, chute 13 comprises a drive portion having endless friction belts 97 engaging around shaft 86 and a shaft 98 to which is pivoted a slide plate discharge end 99. The conveyor portion includes a frame of end and cross members 100, and the chute is raised and lowered by an arm 101 fixed at one end to shaft 86 and at its opposite end to a chain 102 mounted on a sprocket 103 carried by a shaft journaled on uprights 104.

In like manner, the conveyor portion of chute 11 includes a frame 105 and is raised and lowered by means including arms 106 fixed at one end to shaft 45 and at their opposite end to a chain 107 engaged around a sprocket 108 carried by a shaft journaled on uprights 109. A hold-down conveying section is provided at packing station A above the conveying section of chute 11, in the form of endless belts 110 engaging a drive shaft 111 and a shaft 112 secured to arm 106 for movement therewith. The conveyor belts 110 are supported by means including a frame 113, and the lower flight thereof is driven in the same direction and at the same speed as the upper flight of conveyor belts 81. The conveyor belt shafts are part of the frames 100, 105 and 113. Drive shaft 111 is driven through a universal joint connection 139 and a gear 140 engaging a gear 141 on shaft 45.

The operation of this apparatus is believed to be clear from the foregoing description of the packing method. The various actuating motors can be of any desired type, actuated either electrically, pneumatically, hydraulically, mechanically or otherwise. In the illustrated embodiment, air motors are used, and it will be seen from FIG. 20 that gate 6 is adapted to be raised and lowered by an air motor 115 under the control of switches 116 and 117, while gate 7 is adapted to be opened and closed by an air motor 118 under control of switch 116 and a switch 119. Gates 61 and grill 70 also are raised and lowered by motor 115 through the cam arrangements shown in FIGS. 8–11.

Switches 116, 117 and 119 are actuated by pusher bars 120 which extend between conveyor chains 15 and engage behind boxes 2 for moving them along conveyor 1. Plate 93 with its supporting bars 94 for raising sheets 8 containing the layer C of buns above the level of conveyor 12, to temporarily "hold" them, is raised and lowered by a fluid motor 121 under control of switches 122 and 123 also adapted to be sequentially actuated by pusher bars 120. Gate 11 and the upper conveying section 110 are raised and lowered by a fluid motor 124 acting through a chain 125 against a counterweight 126, the motor 124 being controlled by switches 127 and 128 which also are actuated by pusher bars 120. In similar fashion, chute 13 is controlled by a fluid motor 129 through a chain 130 and counterweight 131, the motor being controlled by switches 132 and 133 actuated by the pusher bars 120. The cutter bar motor 35 is controlled by switches 134 and 135 which are actuated both by pusher bars 120 and by roller lugs 136. The roller lugs 136 are positioned midway between pusher bars 120, whereby knife 9 is actuated twice as often as the other elements, and the knife control switches 135 and 134 will be positioned on the side of the machine opposite the side on which all of the other switches are positioned, the lugs 136 being positioned on the same side as the knife control switches. Drive roller 30 for the sheet material is controlled by air clutch 138 and switch 137 which, like knife 9, is actuated both by pusher bars 120 and roller lugs 136.

Thus, the operation of the apparatus is timed through the conveyor 1 from which the various switches and actuating motors are controlled. It will be appreciated that the various switches are so located and arranged along conveyor 1 that the various parts are actuated and operate in the manner previously described.

Accordingly, it is seen that my invention fully accomplishes its intended objects. While I have disclosed and described in detail only one embodiment, that has been done by way of illustration without thought of limitation.

Having fully disclosed and completely described my invention, and its mode of operation, what I claim as new is:

1. The method of packing rolls, buns and similar baked goods in layers in a box which comprises feeding a first sheet of flexible material along a path through a first packing station to a separate second packing station spaced from the first packing station, depositing a first layer of objects to be packed onto the first sheet as the latter is fed along the path, feeding a second sheet of flexible material along the path to the first packing station, depositing a second layer of objects to be packed onto the second sheet as the latter is fed along the path, feeding an open top box through the first packing station and then through the second packing station, feeding the second sheet with the objects thereon into the box through the open top thereof as the box is fed through the first packing station, and thereafter feeding the first sheet with the layer of objects thereon into the box through the open top thereof onto the layer of objects on the second sheet as the box is fed through the second packing station, wherein the objects to be packed are fed along a path prior to the depositing thereof on the sheet material, together with the step of grouping the objects in a predetermined arrangement prior to the depositing thereof on the sheet material by temporarily holding at least certain of the objects against movement along the object feed path.

2. The method of packing rolls, buns and similar baked goods which comprises feeding flexible sheet material to a packing station, feeding objects to be packed along a path to said packing station, grouping the objects to be packed in a predetermined arrangement as they are fed along said path by temporarily holding at least certain of the objects against movement along said path, feeding the grouped objects onto the flexible sheet material, and packing the flexible sheet material with the grouped objects thereon into a box.

References Cited

UNITED STATES PATENTS

| | | | |
|---|---|---|---|
| 2,813,033 | 11/1957 | Schneider | 99—172 |
| 3,354,613 | 11/1967 | Anderson et al. | 53—251 |

HYMAN LORD, Primary Examiner

W. BOVEE, Assistant Examiner